INVENTORS
WILLARD B. ALLEN
CHARLES E. PERSONS
EVERETT C. WESTERFIELD
BY
ATTORNEYS

United States Patent Office 3,337,870
Patented Aug. 22, 1967

3,337,870
LINEAR POLARITY COINCIDENCE CORRELATOR FOR GAUSSIAN SIGNALS
Willard B. Allen, Charles E. Persons, and Everett C. Westerfield, San Diego, Calif., assignors to the United States of America as represented by the Secretary of the Navy
Filed Oct. 19, 1964, Ser. No. 404,994
5 Claims. (Cl. 343—17.5)

The invention described herein may be manufactured and used by or for the Government of the United States of America for governmental purposes without the payment of any royalties thereon or therefor.

This invention relates to signal detectors and in particular, is directed to detectors of the type which correlate a received signal distorted by noise with a known reference signal. The technique of comparing or cross-correlating the locally generated signal to be transmitted with the range-delayed echo signal is quite effective in detecting signals buried so deep in noise that the more conventional detector fails. Interpretation of the output of the detector may be confused by the inability of the system to distinguish between distortion produced in the transmitting media and the distortion produced in the receiving and cross-correlation equipment.

Accordingly, the general object of this invention is to provide an improved linearized cross-correlation detector.

The correlator of the polarity coincidence type is a particularly convenient device for obtaining cross-correlation functions because time delay and multiplication by digital means are less difficult and less expensive than performing the corresponding operations in analog devices. The polarity coincidence correlator has the further advantage of providing automatic normalization for the cross-correlations. Unfortunately, this last advantage occurs for Gaussian-type signals only when the signal of one of the inputs is buried in Gaussian noise, so that the normalized cross-correlation between the two inputs is small compared to unity. In the more general case, which includes signals of the same or larger order of magnitude than the noise, the output voltage is found to be proportional to $\sin^{-1} \rho(\tau)$. Only when $\rho(\tau)$ is small enough to permit replacement of $\sin \rho(\tau)$ by $\rho(\tau)$ is the output voltage linearly proportional to the normalized cross-correlation between the inputs.

A more specific object of this invention is to provide an improved detector whose output voltage may be taken as a linear measure of the normalized cross-correlation of a chosen reference signal with an unknown mixture of this reference signal with noise, even when the voltage of the received signal is large compared to the voltage of the accompanying noise.

In this invention, linearity of the output is achieved by the use of a multiplicity, $m$, of polarity coincidence correlators. That is, an "$m$" number of local generators separately generate Gaussian-type signals, $x_1, x_2, \ldots x_m$, and the transmitted signal is composed of the sum of these components. The receiver portion of the equipment for receiving the transmitted wave after a time delay, receives signal $x_0$, modified and distorted by additive noise voltage, $n$, picked up from the transmitting media. The locally generated components, $x_1, x_2, \ldots x_m$, as well as the received signal, $x+n$, are each limited in an ideal limiter. The locally generated components are delayed for time, $\tau$, and are multiplied against the received signal $x_0 = x+n$, in multipliers coupled into the several delay lines. After multiplication and time averaging, the several signals are added coherently. As will appear evident from FIG. 2, ideal linearity between the output and the normalized cross-correlation of the transmitted and received waveforms is approached as the number of correlators, $m$, is increased.

Other features and objects of this invention will appear to those skilled in the art by referring to the preferred embodiments described in the following specification and shown in the accompanying drawings in which.

Figure 1:
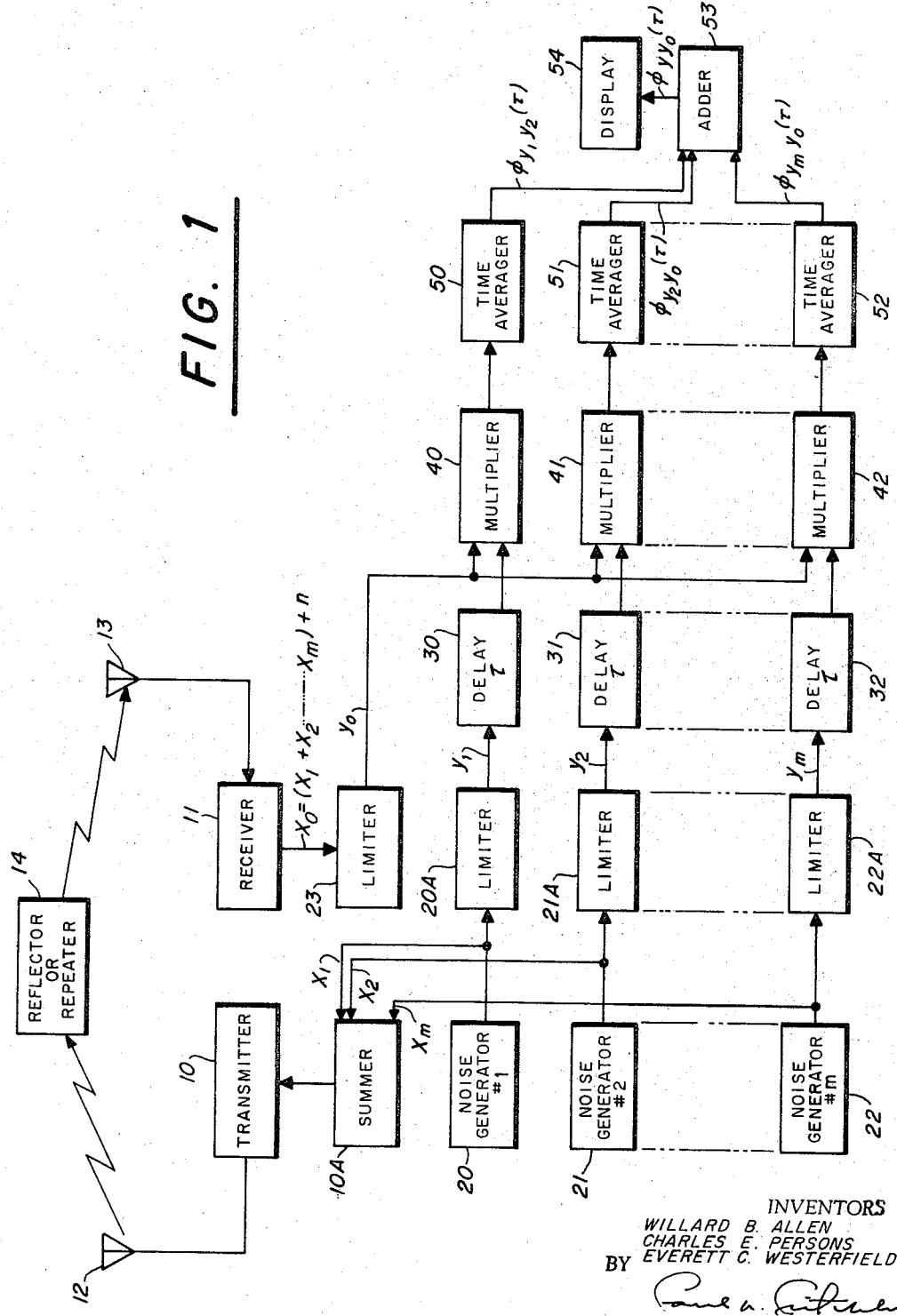
FIG. 1 is a block diagram of a system employing the detector of this invention.

The particular system in which the detector of this invention is to be used comprises the transmitter 10 and receiver 11 with transducers 12 and 13, respectively, of any type which will relay and transduce the frequencies involved. It is contemplated that either the high frequencies of radar or the low frequencies of sonar are involved, though the invention is not restricted to these frequencies. At 14 is shown an object from which the transmitted waves are to be reflected or are to be repeated. Such a system is commonly employed in direction finding and range determination. Continuous or intermittent signals from the transmitter are composed of components from noise generators 20, 21 and 22. There are $m$ such generators and each is capable of producing a unique noise-like signal. The generators may comprise shift register encoders or white noise diode generators. The output of the generators labeled $x_1, x_2 \ldots x_m$ are added linearly in the summer 10A, are amplified in the transmitter 10, and are transmitted. The signal $x_0$ received by the receiver 11 is comprised of the signal $x_1+x_2+\ldots+x_m$ as well as noise, $n$, acquired during transmission.

The received signal $x_0$ is passed through the limiter 23 while the outputs, respectively, of the local generators 20, 21 and 22 are connected through limiters 20A, 21A and 22A. Preferably, high gain difference amplifiers are connected in cascade to form what is commonly called a clipper to approach the conditions of an ideal limiter. The outputs of the limiters are logical "1" or "0," or $+1$ or $-1$ so that the detector of this system becomes a polarity-coincidence correlator.

The limited locally generated signals are delayed, respectively, in delay lines 30, 31 and 32. The delay is adjustable to match the transmission delay between the transmitting transducer 12 and the receiving transducer 13.

Now, the limited received signal $y_0$ is multiplied against the limited locally generated signals $y_1, y_2, \ldots y_m$ in multipliers 40, 41, and 42. The outputs of the multipliers are time averaged in averagers 50, 51 and 52. The time averaged signals are added in adder 53 and are applied to utilization equipment such as the display 54.

In evaluating the output of the multiplier 40, $x_1$ can be considered the useful signal, and $x_2+x_3+\ldots x_m+n$ can be considered as noise. That is, all but $x_1$ in the sum applied to the limiter 23 can be considered as noise as far as $x_1$ is concerned. Similar comments can be applied to each of the other multiplier-averager circuits. Separately, each correlator circuit of FIG. 1 is a polarity coincidence correlator operating in the more linear portion of the $(2/\pi) \sin^{-1} \rho_{x_1 x_0}(\tau)$ output curve, where $\rho_{x_1 x_0}$ is the correlation function of two input signals $x_1$ and $x_0$, one of which is delayed time $\tau$. When the outputs are summed coherently, one may expect that the signal portions will add voltagewise while the noise outputs will add powerwise, thereby regaining some of the signal-to-noise ratio lost by mixing the reference signals for transmission. Since each correlator is functioning in the more linear region of the $(2/\pi) \sin^{-1} \rho_{x1x0}(\tau)$ curve, the total output will be found to be more linear than a single polarity coincidence correlator.

The sum of the normalized outputs, $\rho_{yy0}(\tau)$, of $m$ individual polarity coincidence correlators is $$\rho_{yy}(\tau)_0 = \frac{2}{\pi}\sqrt{m} \sin^{-1}\left(\frac{\rho_{xx_0}(\tau)}{\sqrt{m}}\right)$$

It will be seen that as $m$ increases, $$\sin^{-1}\frac{\rho_{xx_0}(\tau)}{\sqrt{m}}$$

approaches $$\frac{\rho_{xx_0}(\tau)}{\sqrt{m}}$$

Figure 2:
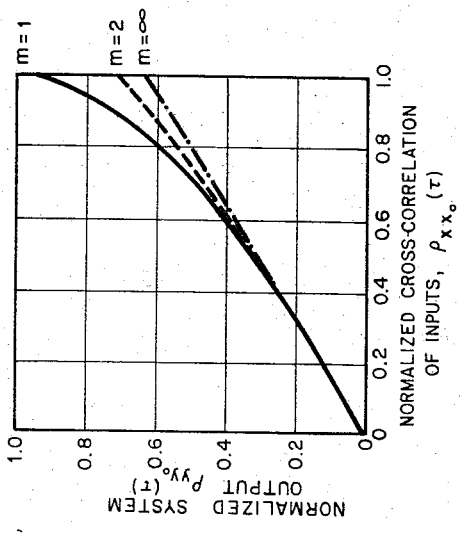
FIG. 2 shows a family of curves relating the number, $m$, of correlators to the system linearity.

Actual values of output for actual values of input are plotted in FIG. 2 for values of $m=1, 2, \infty$. It is apparent that as $m$ becomes large, the output to input relationship becomes more linear. It will be noted that for small input signal-to-noise ratios the output signal-to-noise ratio in any case remains constant as $m$ changes.

One of the more difficult problems encountered in designing sonar systems of the type shown in FIG. 1 is that of storing the reference signal or, alternatively, that of obtaining long delays with high stability non-dispersive delay lines required to bring the reference and waterborne signals into correlation. This time delay may be many seconds where the range of the transmitted-to-received signals may be many thousands of yards in salt water.

Where the time delay is known, the problem of obtaining long-time delays is alleviated by the development of function generators of the type known as shift register encoders or pseudo-random signal generators. When the noise generators 20, 21, 22 of FIG. 1 are of the shift register encoder type, their outputs (broadband noise-like signals) can be duplicated at any other time or place if accurate shifting frequencies are available to drive the registers.

Figure 3:
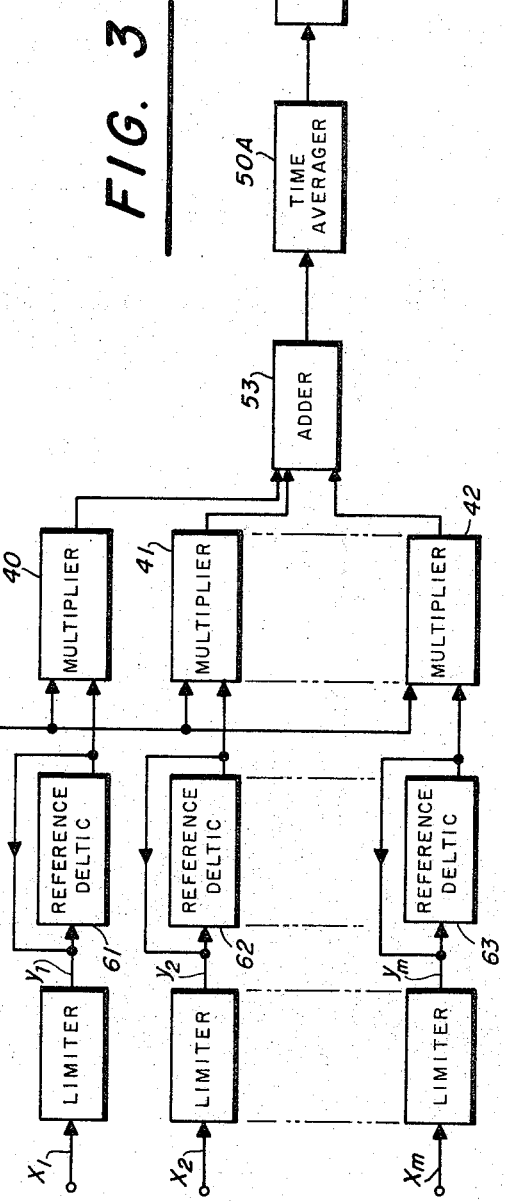
FIG. 3 is a block diagram of the detector of this invention incorporating a recirculating delay line time compressors.

For the case of unknown time delays the shift register encoders provide simple sources for the stored reference signals, and the development of delay line time compressors provides means of rapid search in time delay. As shown in FIG. 3, the outputs $x_1, x_2 \ldots x_m$ are fed into the recirculating delay line time compressors 61, 62 and 63, and the output $x_0$ of the receiver is fed into time compressor 60. Such a time compressor, better known in the art by its acronym "DELTIC" comprises a time compression system (for clipped and sampled signals) employing a closed loop delay line with logic circuits to control the flow of stored samples. In the loading mode, the delay line for the received signal is designed to hold N-1 two-level samples each of time length $T_0$. The recirculation or round trip time for a sample is $T_s-T_0$. The incoming, low-frequency signal is clipped and sampled into the delay line at uniform intervals, $T_s$, so that the next input sample will be injected one same space, $T_0$, behind the previous one after the previous input sample has circulated once through the delay line. The interval between successive samples is thus compressed by a factor $T_p/T_0=N$. After the components, $x_1, x_2 \ldots x_m$ of the transmitted signal have been sampled into the reference DELTICS 61, 62, 63, respectively, the reference DELTICS will shift to the storage mode for which the recirculation period is $T_s$. The Receive DELTIC will continue to operate in the loading mode. During the next interval, $T_s$, between input samples all stored samples will appear in proper sequence at the reference DELTIC outputs, but the samples in the receive DELTIC will have processed one sample space with respect to the samples in the reference DELTICS, which are now operating in the storage mode. A more detailed treatment of the DELTIC delay device may be found in the U.S. Patent to V. C. Anderson, No. 2,958,039 dated Oct. 25, 1960. In FIG. 3, after time compression, each pair of signals is multiplied, respectively, in multipliers 40, 41 and 42. In this embodiment, the outputs of the multipliers are first added in adder 53 and are then time averaged in the single time averager 50A, and finally recorded or displayed in device 54.

Figure 4:
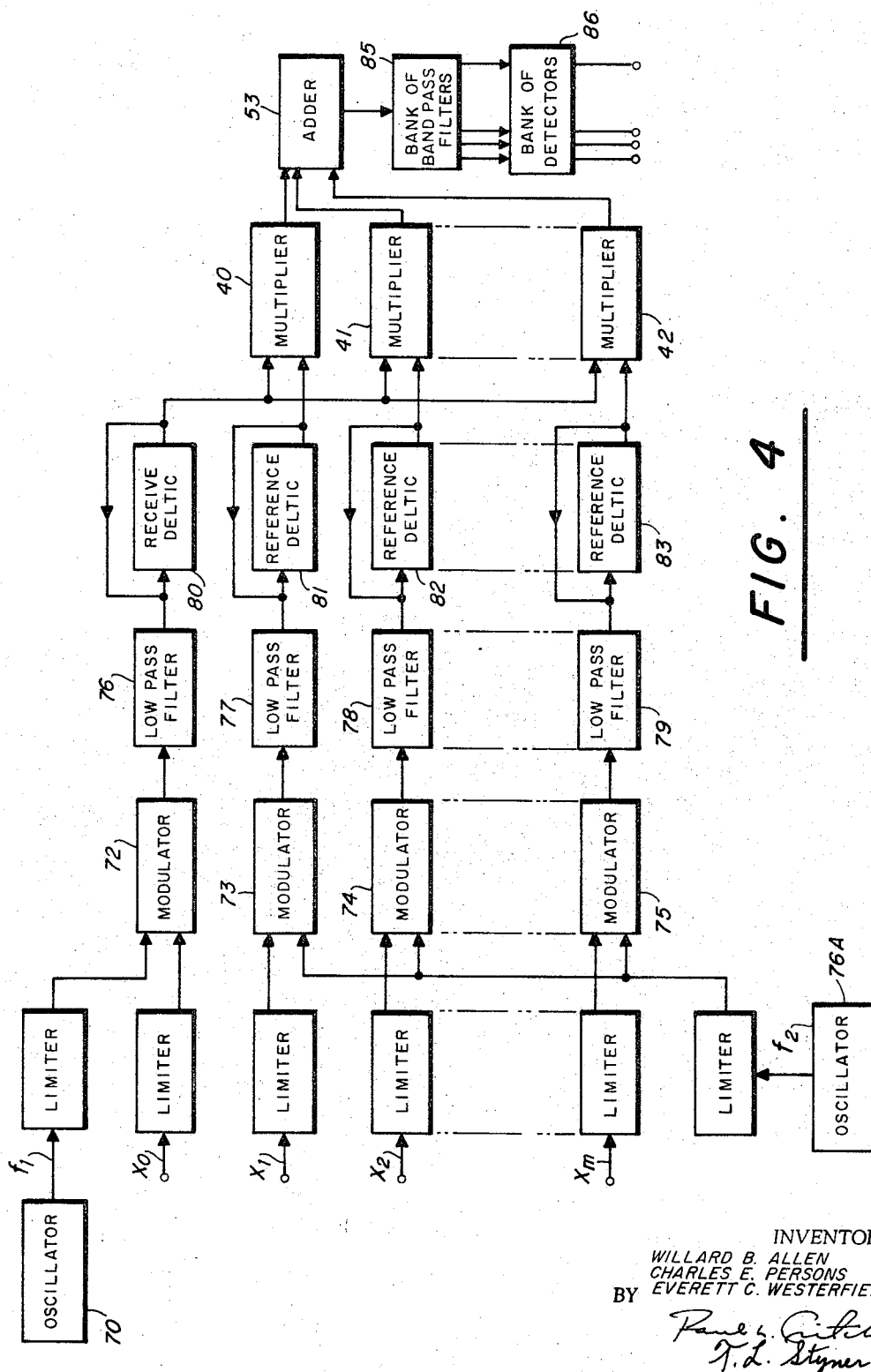
FIG. 4 is a block diagram of the detector of this invention employing time compressors and heterodyne frequency shifting means.

If the range between the transmitter-receiver of FIG. 1 and the target 14 is changing, the resulting Doppler frequency shift must be corrected. FIG. 4 shows the application of the multiple correlator scheme of this invention to a difference frequency system which is adapted to cover large ranges in Doppler. In FIG. 4, the received signal $x_0$ is shifted in modulator 72 by the locally generated frequency $f_1$ of oscillator 70. The reference signals $x_1, x_2 \ldots x_m$ are modulated, respectively, in modulators 73, 74 and 75 by the frequency $f_2$ of local oscillator 76. Preferably, the lower sideband components of each modulator output are selected respectively, in the lowpass filters 76, 77, 78 and 79. Each signal is time compressed respectively in the recirculating delay line time compressors 80, 81, 82 and 83. The frequency shifted and time compressed received signal, $x_0$, is multiplied with the reference signals $x_1, x_2, \ldots x_m$ in multipliers 40, 41 and 42, whereupon the multiplied products are added in adder 53 and applied to the bank of bandpass filters 85. The amount of Doppler frequency shift determines in which of the filter outputs the signal will appear. The output of each bandpass filter is detected in the series of detectors 86. If, for example, the reference frequency band extended from 350 to 450 cycles per second, the frequency $f_1$ of the oscillator 70 could be 340 c.p.s. so that the output of the modulator selected by the lowpass filter 76 would be 10 to 110 c.p.s. The frequency $f_2$ of oscillator 76 would then be selected at 350 c.p.s. so that output of the bandpass filters 77–79 would be 0–100 c.p.s. A sampling rate of 200 then would give the resolution desired.

It is apparent now that the correlation function at the output of the system of this invention will be linearly related to the normalized cross-correlation of the transmitted and received waveforms.

Many modifications may be made in the details of the systems of this invention without departing from the scope of the appended claims.

What is claimed is:

1. A transmitter-receiver station in a communication system comprising;
    an $m$-number of local generators for simultaneously separately generating broad-band Gaussian noise voltages, $x_1, x_2, \ldots x_m$, respectively;
    a transmitter for transmitting signal $x_0$ composed of the sum of said noise voltages;
    a receiver for receiving, after a transmission time delay $\tau$, said signal $x_0$ modified by additive noise voltages $n$ of the transmission media;
    means for relatively delaying the locally generated voltages $x_1, x_2, \ldots x_m$ with respect to the received signal $x_0+n$;
    a plurality of multipliers, each multiplier having two inputs, one input of each multiplier being connected to the output of said receiver and the other input of each multiplier being connected, respectively, to the output of one of said local generators for multiplying the received $x_0+n$ signal with each of said separate voltages $x_1$ to $x_m$, respectively;
    means for averaging the product of each multiplication to derive a cross correlation function of each multiplication pair;
    means for coherently adding said cross-correlation functions to derive a voltage linearly related to the normalized cross-correlation of received signal, $x_0$, and the transmitted signal, $x$.

2. In a system of the class described;

a plurality $m$ of shift register encoders for generating, respectively, pseudo-random noise signals $x_1, x_2 \ldots x_m$;

a receiver for receiving a signal $x_0$ composed of said $x_1, x_2, \ldots x_m$ signals plus noise voltage $n$;

a plurality, $m$, of signal delay means connected, respectively, to the output circuits of said encoders for relatively delaying each signal $x_1, x_2, \ldots x_m$ with respect to $x_0$ and a plurality of multipliers, each multiplier having two inputs, one input of each multiplier being connected to the output of said receiver and the other input of each multiplier being connected to a different one of said encoders for multiplying $x_0$ respectively with $x_1, x_2, \ldots x_m$;

means connected to the output of each multiplier for time averaging the multiplied products;

means connected to the output of said time averaging means for adding the averaged products; and means for displaying the added components.

3. The system defined in claim 2 further comprising limiter devices connected in the output of the receiver and in the output of said noise generators, respectively, for deriving polarity coincident correlation functions to facilitate multiplication and averaging.

4. In the system defined in claim 3 recirculation delay line time compressors connected, respectively, in the output of each limiter device.

5. The system defined in claim 2 further comprising a local oscillator of frequency $f_1$ and a local oscillator for generating frequency $f_2$;

a modulator for heterodyning $f_1$ with received signal $x_0 + n$; and a plurality of modulators for heterodyning signals $x_1, x_2 \ldots x_m$, respectively with said frequency $f_2$.

References Cited

UNITED STATES PATENTS 3,158,830   11/1964   Clay _____ 340—3
3,259,878   7/1966   Mifsud _____ 340—15.5

OTHER REFERENCES

Allen, W. B. & Westerfield, Digital Compressed Time Correlators and Matched Filters. In Jour. of Acoustical Society of America, vol. (36) (1), January 1964, pp. 121, 133–134.

Turlin, G. L. Introduction to Matched Filters, In IRE Trans. on Information Theory, vol. IT–6, No. 3, pp. 331, 324, June 1960.

RODNEY D. BENNETT, *Primary Examiner.*

G. M. FISHER, C. L. WHITHAM,
                          *Assistant Examiners.*